United States Patent
Pratka et al.

(10) Patent No.: US 10,829,056 B2
(45) Date of Patent: Nov. 10, 2020

(54) VEHICLE CARGO SECUREMENT SYSTEM

(71) Applicant: Gene's Machine, Inc., Victoria, TX (US)

(72) Inventors: Wesley Keith Pratka, Victoria, TX (US); Dwaine Gene Pratka, Victoria, TX (US)

(73) Assignee: Gene's Machine, Inc., Victoria, TX (US)

( * ) Notice: Subject to any disclaimer, the term of this patent is extended or adjusted under 35 U.S.C. 154(b) by 0 days.

(21) Appl. No.: 16/363,542

(22) Filed: Mar. 25, 2019

(65) Prior Publication Data

US 2019/0299872 A1    Oct. 3, 2019

Related U.S. Application Data

(60) Provisional application No. 62/649,562, filed on Mar. 28, 2018.

(51) Int. Cl.
*B60R 9/06* (2006.01)

(52) U.S. Cl.
CPC ............... *B60R 9/06* (2013.01); *B60R 9/065* (2013.01)

(58) Field of Classification Search
CPC ............. B60R 9/06; B60R 9/065; B60R 7/14
USPC ... 224/401, 402–405, 42.32, 42.4, 430, 545, 224/547, 564; 403/375, 380, 381, 254
See application file for complete search history.

(56) References Cited

U.S. PATENT DOCUMENTS

| | | | | |
|---|---|---|---|---|
| 2,492,841 A | * | 12/1949 | Burkey | B60R 9/00 414/462 |
| 3,055,462 A | * | 9/1962 | Steele | A47B 57/50 403/18 |
| 3,685,708 A | * | 8/1972 | Herrington | B60R 11/02 224/483 |
| 3,727,813 A | * | 4/1973 | Eby | B60R 11/02 224/540 |
| 4,267,948 A | * | 5/1981 | Lewis | B60R 9/00 211/191 |
| 4,450,989 A | * | 5/1984 | Bogar, Jr. | A47B 81/005 211/64 |
| 4,480,773 A | * | 11/1984 | Krauser | B62J 7/00 224/443 |
| 4,611,734 A | * | 9/1986 | Luecking | B60R 11/0241 108/44 |
| 4,754,901 A | * | 7/1988 | Villanueva | H04R 1/026 224/418 |
| 5,038,983 A | * | 8/1991 | Tomososki | B60R 9/065 224/521 |
| 5,161,268 A | * | 11/1992 | Harrow | A47C 19/04 5/201 |
| 5,165,645 A | * | 11/1992 | Brown | B60N 3/103 248/310 |

(Continued)

*Primary Examiner* — Justin M Larson
(74) *Attorney, Agent, or Firm* — Thomas N. Hendryx

(57) ABSTRACT

A configurable cargo retention system with a cargo tray installed in the cargo area of a vehicle for secure transport wherein the cargo tray has a profile conforming to the cargo. The cargo retention system may have a base rail attached to a vehicle, a case support attached to the base rail, a case mount, and a cargo case. The cargo retention system may also retain a cargo case, such as a gun case, tool case, ice chest, or other case that the user wished to hold securely. Case supports may have pivoting rails that are attached to the case mounts which are secured to rails.

10 Claims, 6 Drawing Sheets

(56) References Cited

U.S. PATENT DOCUMENTS

| | | | | |
|---|---|---|---|---|
| 5,167,433 A * | | 12/1992 | Ryan | B60R 7/02 220/533 |
| 5,232,135 A * | | 8/1993 | Marren | B60R 9/06 224/317 |
| 5,381,939 A * | | 1/1995 | Tippets | B60R 9/04 224/309 |
| 5,492,259 A * | | 2/1996 | Tippets | B60R 9/00 224/309 |
| 5,516,020 A * | | 5/1996 | Lawler | B60R 9/00 211/19 |
| 5,544,799 A * | | 8/1996 | Didlake | B60R 9/06 224/282 |
| 5,725,137 A * | | 3/1998 | MacDonald | B60R 9/00 211/206 |
| 5,813,579 A * | | 9/1998 | Hendrickson | B60N 3/103 224/42.11 |
| 5,878,929 A | | 3/1999 | Leonard | |
| 6,230,910 B1 * | | 5/2001 | Olsson | A47B 57/50 211/192 |
| 6,382,484 B1 * | | 5/2002 | Savant | B60R 7/14 224/282 |
| 6,457,618 B1 * | | 10/2002 | Hancock | B60R 7/14 224/319 |
| 6,641,014 B2 * | | 11/2003 | McNalley | B60R 7/14 224/281 |
| 6,913,286 B2 | | 7/2005 | Kramer | |
| D515,495 S * | | 2/2006 | Storer | D12/406 |
| 7,066,366 B2 | | 6/2006 | Hancock et al. | |
| 7,198,185 B2 * | | 4/2007 | Storer | B60R 9/00 224/403 |
| 7,281,646 B2 * | | 10/2007 | Flannery | B60R 9/06 126/276 |
| 7,322,499 B2 * | | 1/2008 | Storer | B60R 9/00 224/403 |
| 7,559,444 B1 | | 7/2009 | Church | |
| 7,676,978 B2 * | | 3/2010 | Marlatt | F41A 23/02 42/94 |
| 7,966,949 B2 * | | 6/2011 | Willey | B60N 3/002 108/25 |
| 8,360,288 B2 * | | 1/2013 | Shih | B62J 7/04 224/42.4 |
| 8,474,561 B2 * | | 7/2013 | Allingham | B60R 9/06 180/89.11 |
| 8,534,519 B2 | | 9/2013 | Hancock et al. | |
| 8,646,668 B2 * | | 2/2014 | Oakes | B60R 9/065 224/401 |
| 8,820,598 B2 * | | 9/2014 | Tennyson | B60R 9/065 224/509 |
| 8,875,830 B2 | | 11/2014 | Massicotte et al. | |
| 9,290,132 B2 * | | 3/2016 | Anton | B60R 9/08 |
| 9,555,746 B2 * | | 1/2017 | Weihl | B60R 11/06 |
| 9,694,759 B1 * | | 7/2017 | VanAmburgh | B60R 9/08 |
| 9,713,989 B2 * | | 7/2017 | Anton | B60R 9/06 |
| 9,961,995 B2 * | | 5/2018 | Kam | A47B 57/485 |
| 9,964,380 B1 * | | 5/2018 | Oglesby | F41C 23/16 |
| 10,112,545 B1 * | | 10/2018 | Gaskins | B60R 9/065 |
| 10,488,141 B2 * | | 11/2019 | Page | B60R 7/14 |
| 2004/0079779 A1 * | | 4/2004 | Essig | B60R 9/00 224/550 |
| 2007/0034655 A1 * | | 2/2007 | Storer | B60R 9/00 224/403 |
| 2007/0175937 A1 * | | 8/2007 | Caldwell | B60R 9/06 224/401 |
| 2009/0159540 A1 * | | 6/2009 | Meeks | B60R 7/14 211/64 |
| 2011/0198375 A1 * | | 8/2011 | Bennett | B60R 7/14 224/401 |
| 2019/0291677 A1 * | | 9/2019 | Ajam | B60R 21/13 |
| 2019/0299870 A1 * | | 10/2019 | McCourt | B60R 7/14 |
| 2019/0299872 A1 * | | 10/2019 | Pratka | B60P 7/0815 |
| 2019/0315519 A1 * | | 10/2019 | Brennan | B65D 25/20 |
| 2020/0086801 A1 * | | 3/2020 | Anton | B60R 9/06 |
| 2020/0130599 A1 * | | 4/2020 | Anton | B60R 9/06 |

* cited by examiner

VEHICLE CARGO SECUREMENT SYSTEM

TECHNICAL FIELD

The present invention generally relates to a system for transporting cargo in or on a vehicle or other transportation device.

BACKGROUND

Many transportation devices, including off-road recreational vehicles, provide a cargo space and/or rack upon which cargo is secured for transportation. The user may secure items to a rack with bungee cords or other tie downs using various tie-down configurations. Tie-downs and bungee cords can have difficulty securing cargo. In some cases the cargo may need to be placed in a case for convenience or protection. Therefore, there is a need for an improved system for securing and transporting cargo items in various vehicles.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
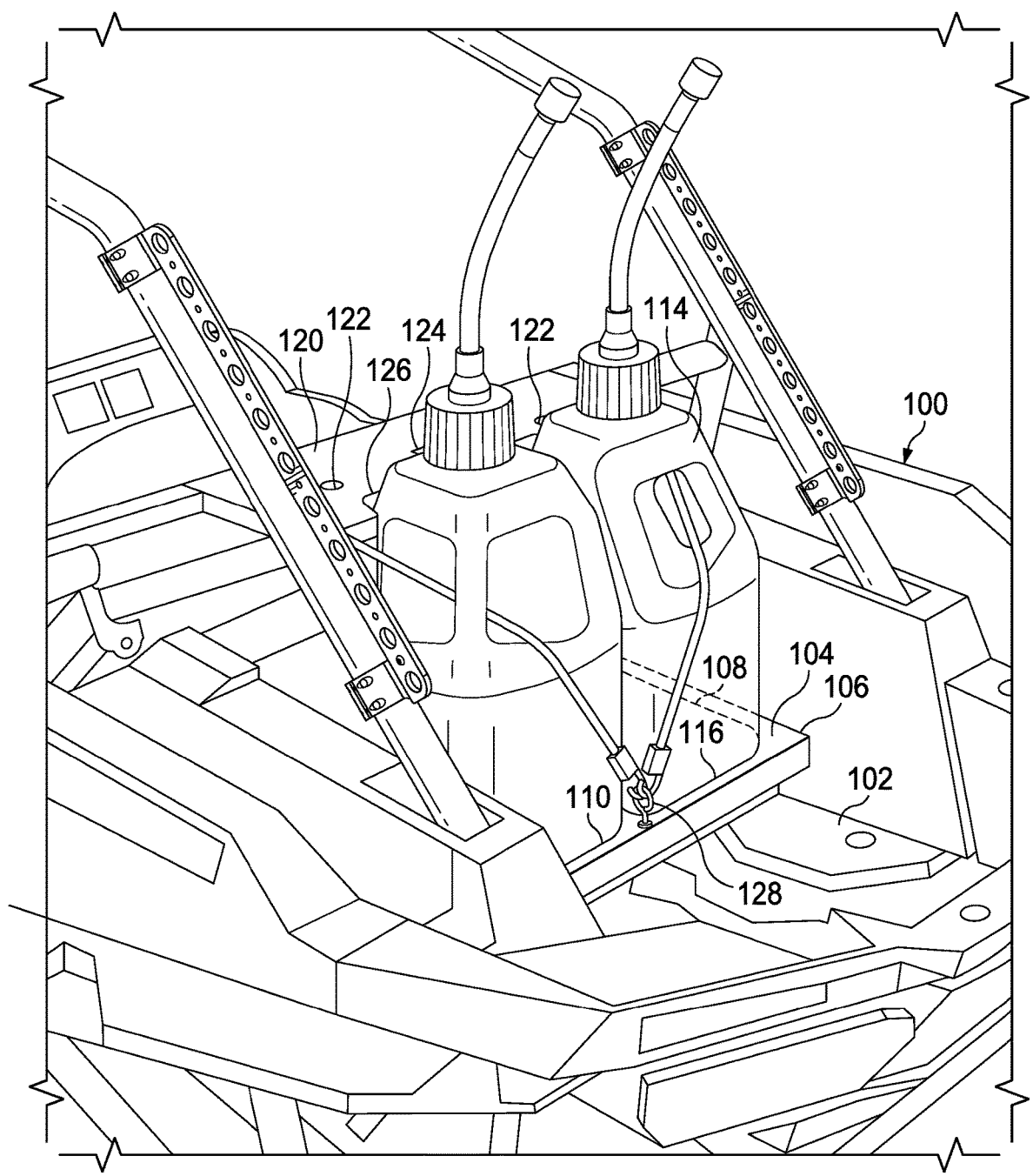
FIG. 1 is a cargo retention system placed in an off-road utility vehicle the cargo area in accordance with a first embodiment.

Turning to FIG. 1, shown is a vehicle 100 with a cargo area 102 wherein a cargo retention system is placed. It should be understood that the vehicle 100 could be an on or off-road vehicle. Non-limiting examples include recreational utility vehicles, side-by-side off-road vehicles (UTVs), all-terrain vehicles (ATVs), water vehicles such as boats or personal watercraft, or turf vehicles. In one embodiment, the vehicle 100 is a Polaris RZR. The cargo area 102 may be located in any part of the vehicle, but in FIG. 1 is shown in the rear of a UTV.

Figure 2:
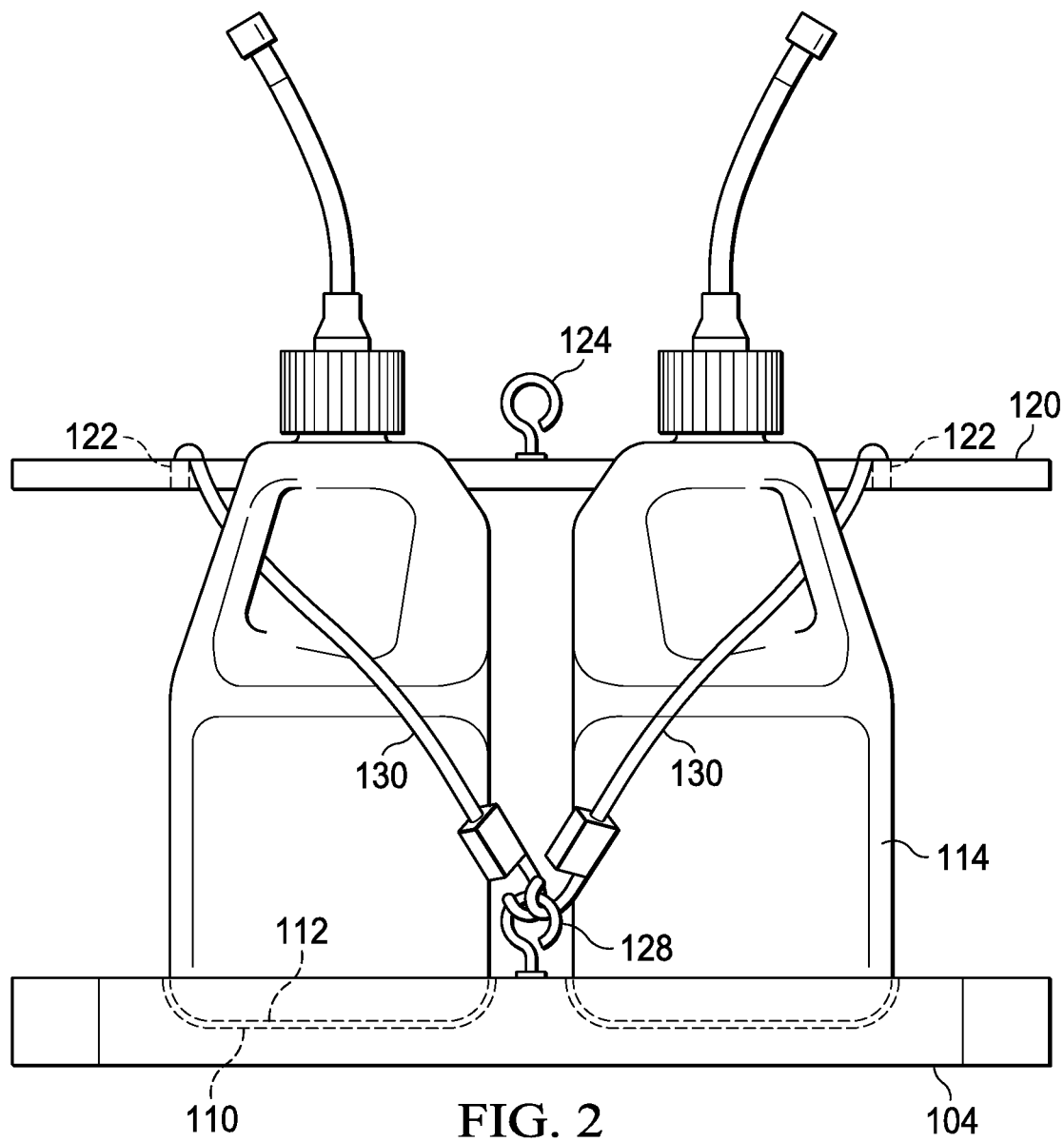
FIG. 2 is a side view of a cargo retention systems with cargo in place according to a first embodiment.

Referencing FIGS. 1 and 2, in one embodiment the cargo retention system comprises a cargo tray 104. The cargo tray 104 is installed in the cargo area 102 of a vehicle 100. Cargo 114 is placed in the cargo tray 104 for secure transport. In some embodiments, the cargo area 102 has a cargo area profile defined by the design and construction of the cargo area 102. The cargo tray 104 may have an outer tray profile 106 conforming to the cargo area profile, either precisely or in some fashion that restricts movement of the tray. The cargo tray 104 is sufficiently deep to allow a piece or pieces of cargo 114 to be placed inside the cargo tray 104 and the tray edge 116 will resist the cargo 114 sliding out of the cargo tray 104. In some embodiments, the outer tray profile 106 restrains the cargo tray 104 from moving laterally in one or more directions. In some embodiments, the outer tray profile 106 provides for a close-fit between the cargo area 102 and the cargo tray 104. The close-fit restrains the cargo tray 104 from moving laterally in one or more directions while in some embodiments also provides resistance to vertical movement. In still other embodiments, the cargo tray 104 may or may not have an outer tray profile 106 corresponding to the cargo area profile and may be fastened in place with bolts or other suitable fasteners (not shown) to prevent movement of the cargo tray 104.

In further embodiments, the cargo tray 104 has an inner tray profile 110 corresponding to the outer cargo profile 112 of a piece or pieces of cargo 114. The fit of the inner tray profile 110 to the outer cargo profile 112 prevents substantial lateral movement of the cargo 114. In some embodiments, the cargo 114 is one or more fuel or water containers. The fuel or water containers may be of sufficient weight such that once placed in the cargo tray, they will stay in place under normal vehicle 100 use. In other embodiments, the cargo 114 may be restrained from movement, particularly vertical movement, to prevent the cargo 114 from bouncing out or otherwise being dislodged from the cargo tray 104. In some embodiments, the cargo tray 104 is provided with an eyelet 128, hook, or other means of attaching a bungee cord 130 or cargo strap to the cargo tray 104.

In yet another embodiment, the cargo retention system further comprises an upper cargo retainer 120. The upper cargo retainer 120 may have holes 122, eyelets 124, or other means of attaching bungee cords or cargo straps to assist in restraining cargo 114 from moving. In some embodiments, the upper cargo retainer 120 has a retention profile 126 corresponding to an upper profile of the cargo 114. In some embodiments, the upper cargo retainer 201 has rubber bumpers (not shown) or other feature to provide a contact point between the upper cargo retainer 201 and the cargo 114.

Figure 3:
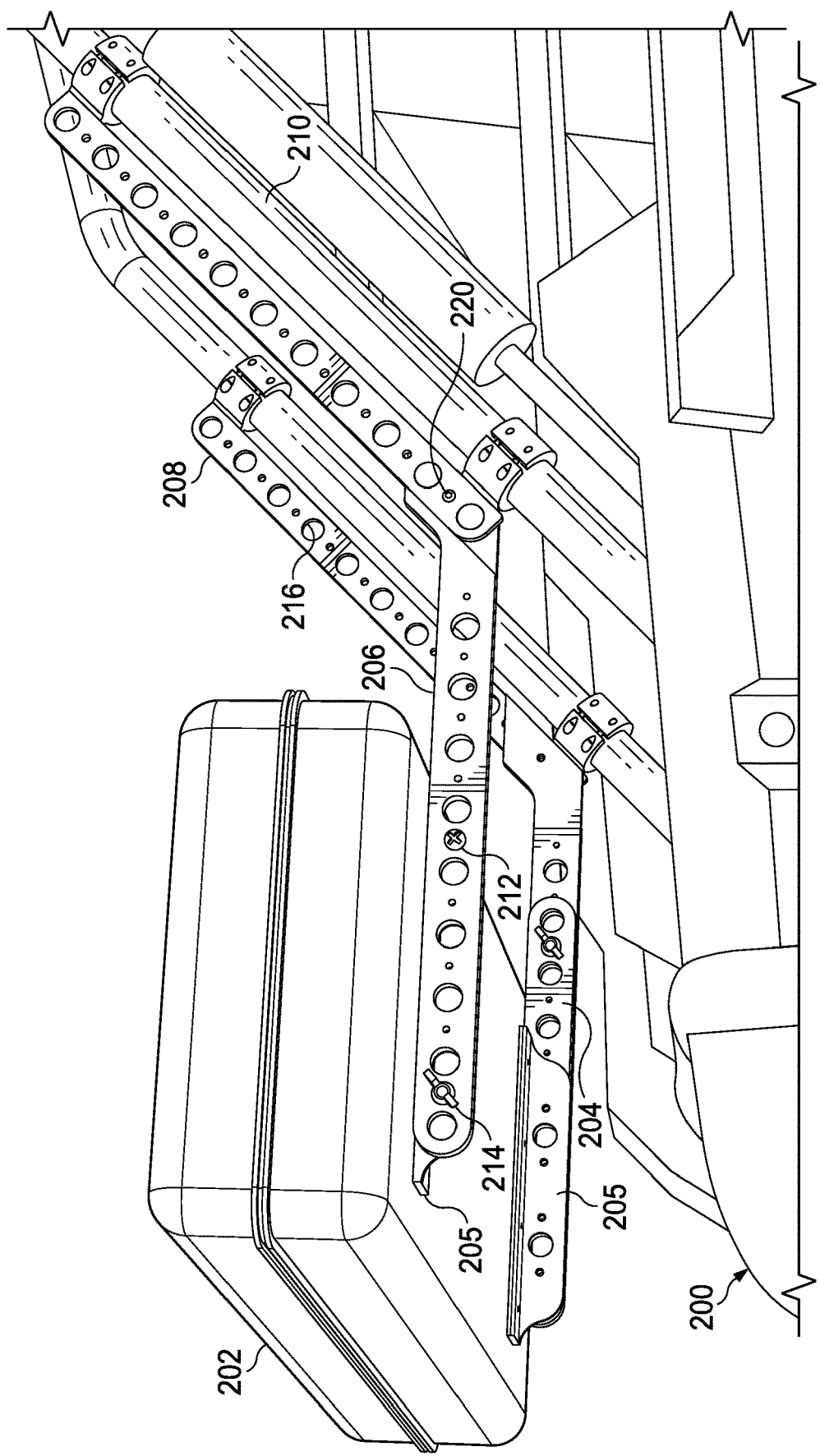
FIG. 3 is a second embodiment of a cargo retention system in a first position.
Figure 4:
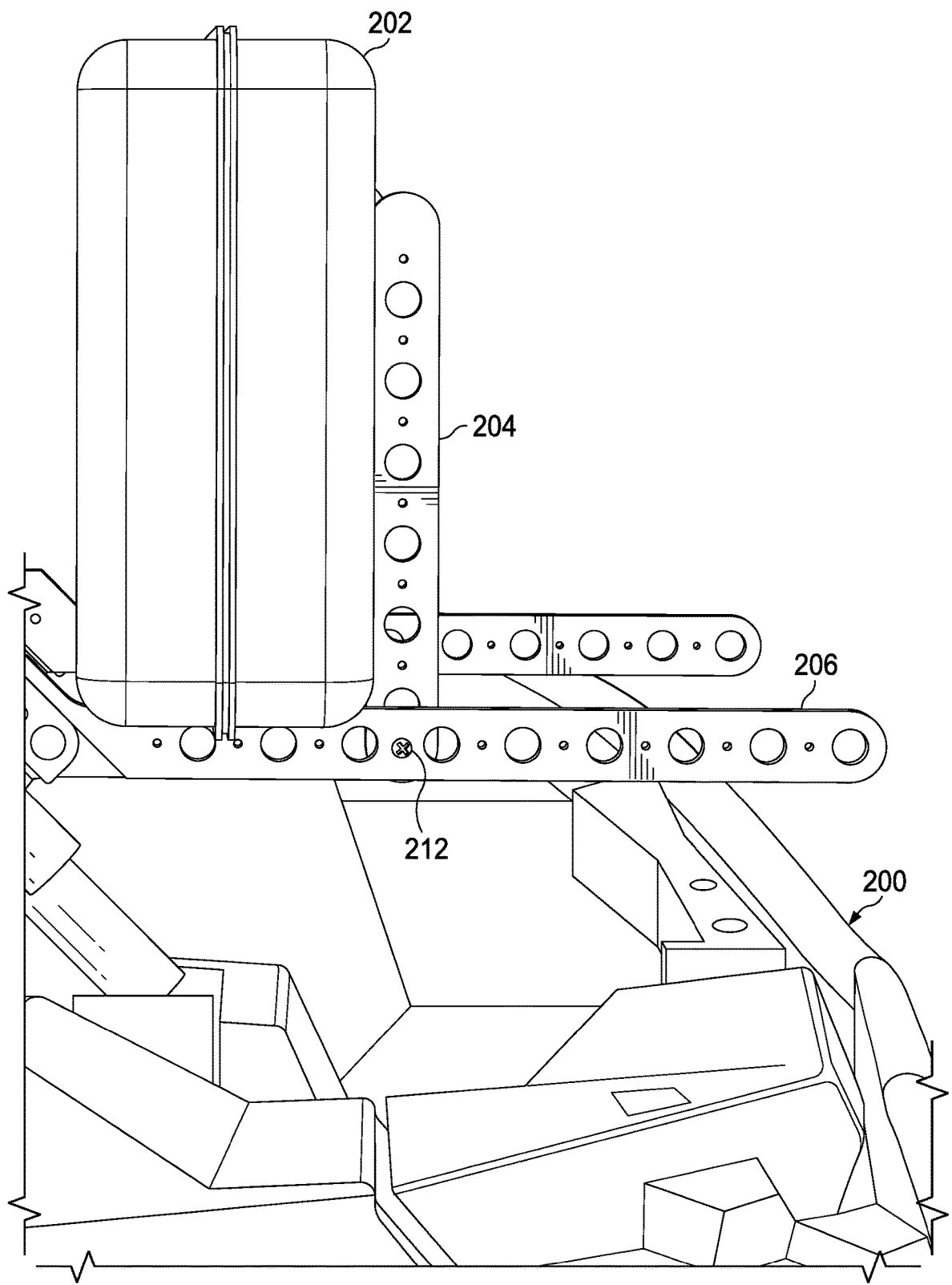
FIG. 4 is a view of a second embodiment of a cargo retention system with the cargo in a second position.

Turning to FIGS. 3 & 4, one embodiment of a cargo retention system is designed to retain a cargo case 202 in a vehicle 200. The cargo case 202 may be a gun case, tool case, ice chest, or other case that the user wished to hold securely. In one embodiment, the cargo case 202 is secured to a case mount 204. The case mount 204 attaches to a case support 206. The case support 206 attaches to a base rail 208, which is in turn attached to a vehicle member 210. In some embodiments, there is an attachment bracket 205 that connects the cargo case 202 to the case mount 204. In some embodiments, the case support 206 can attach to the base rail 208 at a selectable number of positions. In some embodiments, the case support 206 is attached by a pivoting connection 212 at one end and a releasable connection 214 at the other end. This allows the user to release the releasable connection 214 and pivot the cargo case 202 to a second position, allowing access to the area under or behind the cargo case 202. The vehicle members 210 may be a rollover bar or any other suitable vehicle members for attaching the base rails. In one embodiment, releasable connections 214 secure each side of a pair of case mounts 204. The releasable connections 214 may be pull-pins, bolts with wing nuts, or other suitable fastener. In one embodiment, both the releasable connection 214 and pivoting connection 212 can be pulled to remove the cargo case 202 and case support 204 completely.

Figure 5:
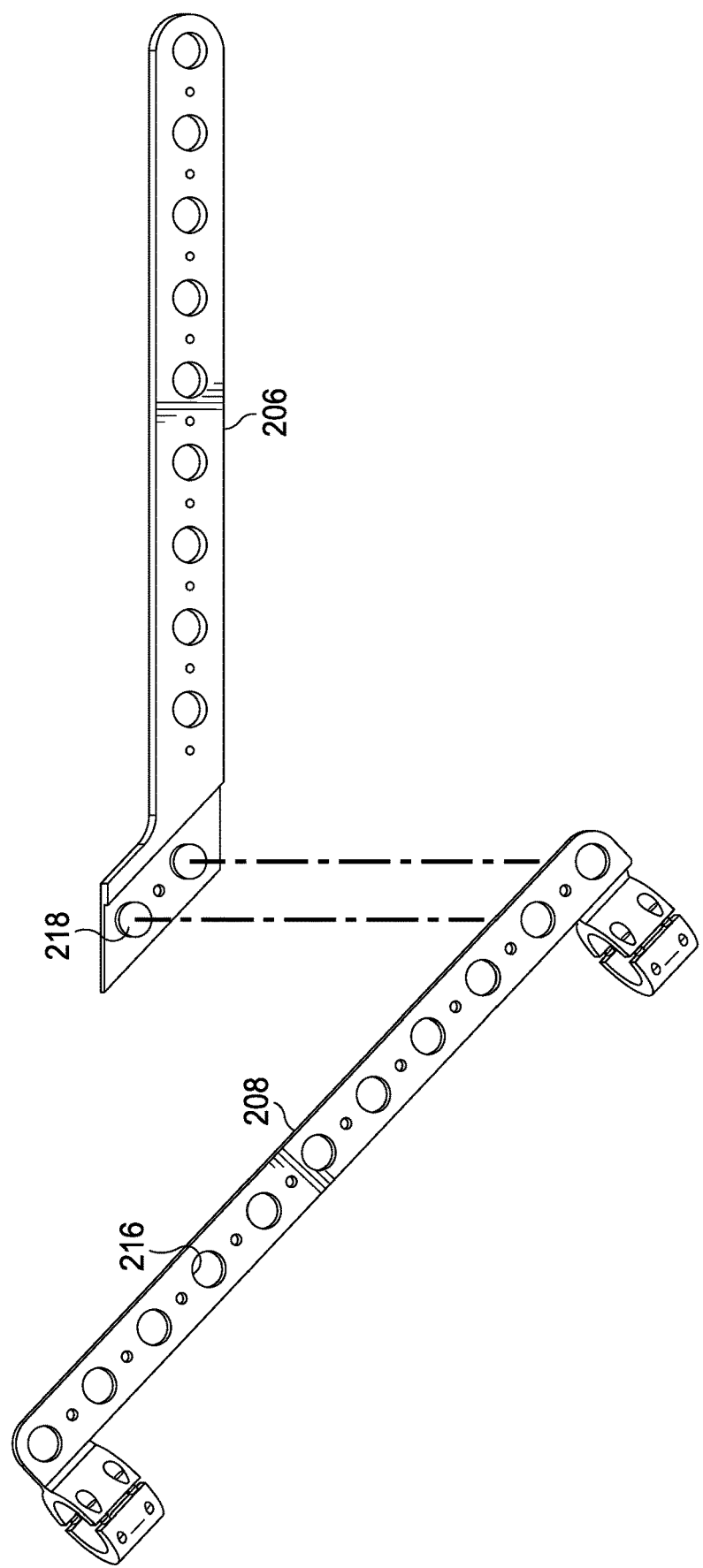
FIG. 5 is a view of the joining system of a cargo support and a base rail.

Referring to FIGS. 3 & 5, in some embodiments the case support 206 is attached to the base rail 208 in any of a number of selectable locations along the base rail 208. In some embodiments the case support 206 engages mounting holes 216 in the base rail. In some embodiments, the base rail 208 has a number of mounting holes 216. In some embodiments the case support 206 has a raised profile 218 matching the mounting holes 216 in the base rails 208. This allows for a tight engagement of the case support 206 to the base rails 208, preventing movement between the two parts. The case support 206 is secured to the base rail 208 by a bolt 220 or other suitable fastener. In alternate embodiments, the case support 206 has raised profiles 218 while the base rail 208 has matching mounting holes. The raised profile 218 may be round, square, or any other suitable shape that provides a tight fit. In still other embodiments, cargo case assemblies (cargo case 202, cargo case mounts 204 and the case support 206) can be secured to the base rail 208 to provide more cargo carrying capacity.

Figure 6:
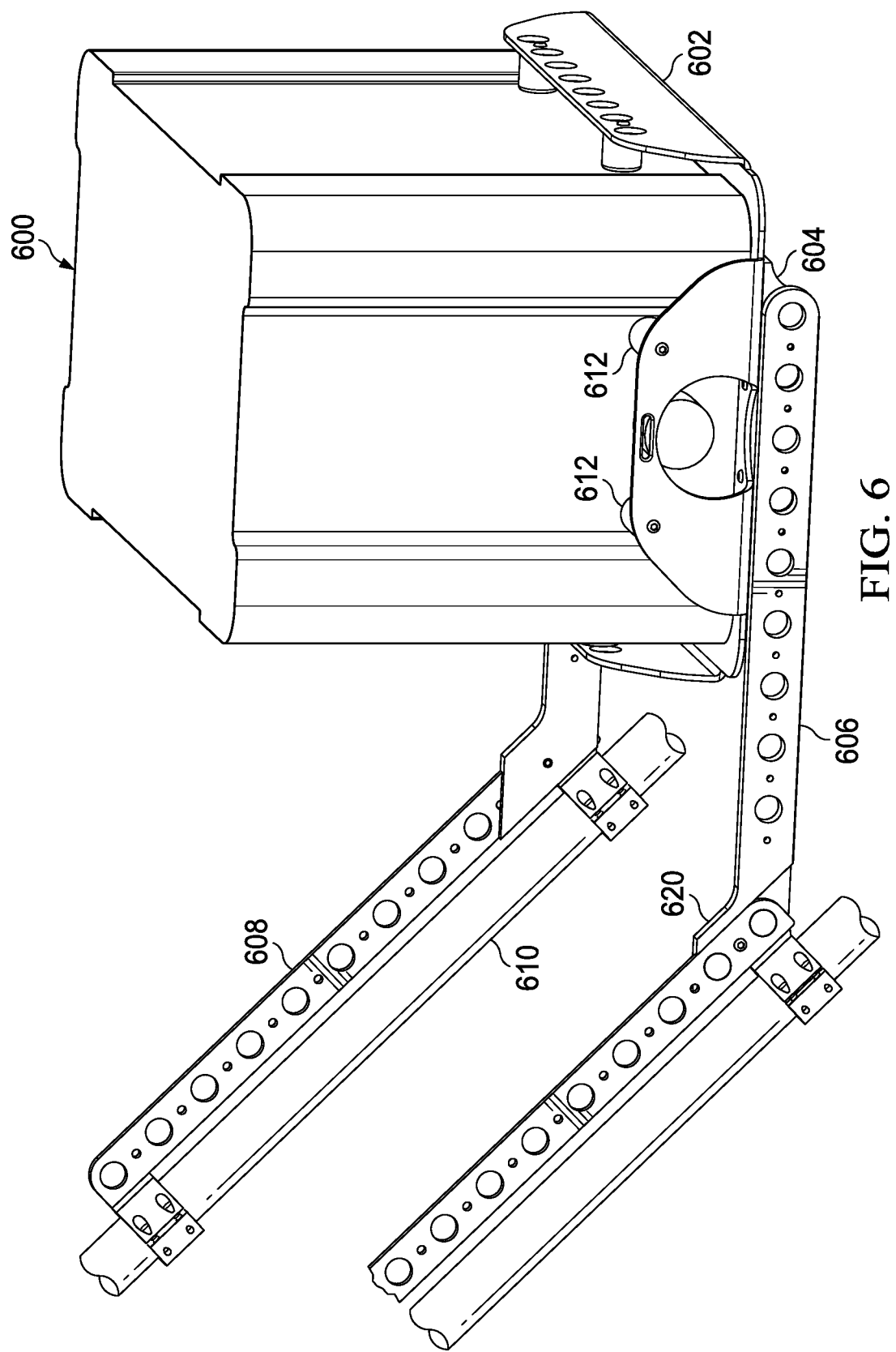
FIG. 6 is a view of a third embodiment of a cargo retention system.

Referring to FIG. 6, in some embodiments, the cargo case may be a cargo tray 602. In this embodiment, the cargo tray 602, has an inside profile that restricts movement of the cargo 600 with compliant bumpers 612 that engage the outside of the cargo 600 and an outer profile that attaches to case mounts 604 which in turn engages case supports 606. In some embodiments as described herein above, the case mounts 604 may be pivotally attached on one end and releasable attached on the other to a case support 606. In other embodiments the case mounts 604 may be releasable attached at all points to facilitate cargo tray 602 removal. The case supports 606 may attach directly to a vehicle member 610 or may attach to base rails 608, which in turn attached to a vehicle member 610. The case supports 606 may engage the base rails 608 with the engagement system shown in FIG. 5 and be held together with a bolt 620 or other suitable fastener. The cargo 600 may be an ice chest or any other cargo container.

Modifications and improvements to the above-described embodiment of the present invention may become apparent to those skilled in the art. The foregoing description is intended to be exemplary rather than limiting.

The invention claimed is:

1. A cargo retention system for a vehicle comprising:
   a base rail attached to a vehicle;
   a case support attached to the base rail;
   a case mount; and
   a cargo case;
   wherein one of either the base rail or case support has at least two mounting holes and wherein the other has matching raised profiles that fit into the mounting holes and wherein a fastener that does not pass through the mounting hole or raised profile holds the base rail and case support together.

2. The cargo retention system of claim 1 wherein the case support attached to the base rail comprises at least two selectable positions for attaching the case support.

3. The cargo retention system of claim 1 further comprising an attachment bracket connecting the cargo case to the case mount.

4. The cargo retention system of claim 2 wherein the case is selected from a group comprising: a gun case; a bow case; a tool case; a cargo tray; and a storage case.

5. The cargo retention system of claim 2 wherein the vehicle is an off-road vehicle.

6. The cargo retention system of claim 1 wherein at least one end of the case mount is pivotally attached to the case support.

7. The cargo retention system of claim 4 wherein one end of the case mount is pivotally attached to the case support and the opposite end is releaseably attached to the case support.

8. The cargo retention system of claim 1 wherein at least one end of the case mount is pivotally attached to the case support and wherein the opposite end is releaseably attached to the case support.

9. The cargo retention system of claim 1 wherein the case mount is releaseably attached to the case support at each end.

10. The cargo retention system of claim 1 wherein the cargo case is a cargo tray further comprising rubber bumpers that engage an outer profile of a cargo.

\* \* \* \* \*